Oct. 18, 1927. 1,646,223
W. STRICKER
DRIER
Filed Oct. 29, 1926 2 Sheets-Sheet 1
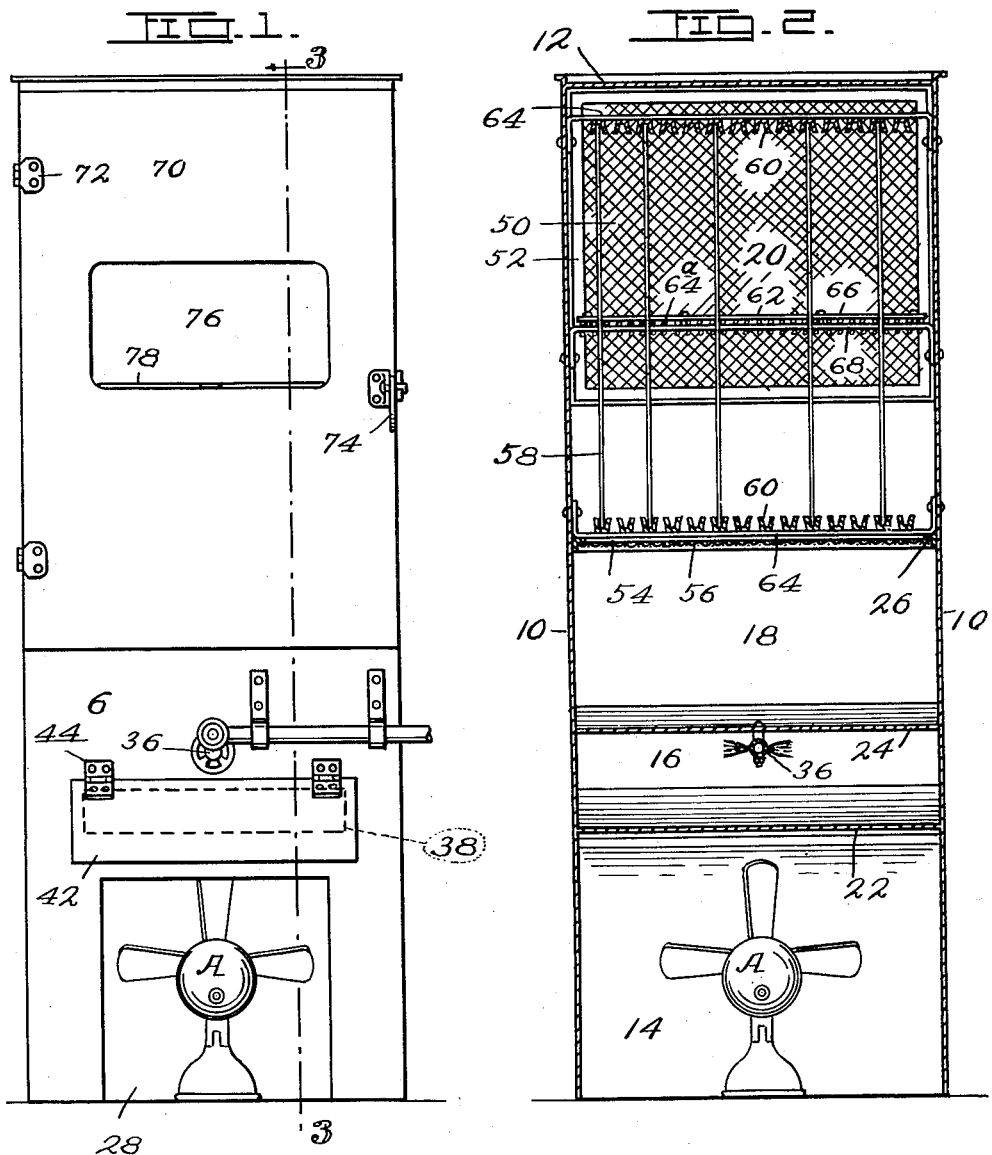
Witness:
Fred C. Rischer.
Inventor:
William Stricker,
By
F. G. Fischer,
Attorney.

Oct. 18, 1927.   W. STRICKER   1,646,223
DRIER
Filed Oct. 29, 1926   2 Sheets-Sheet 2
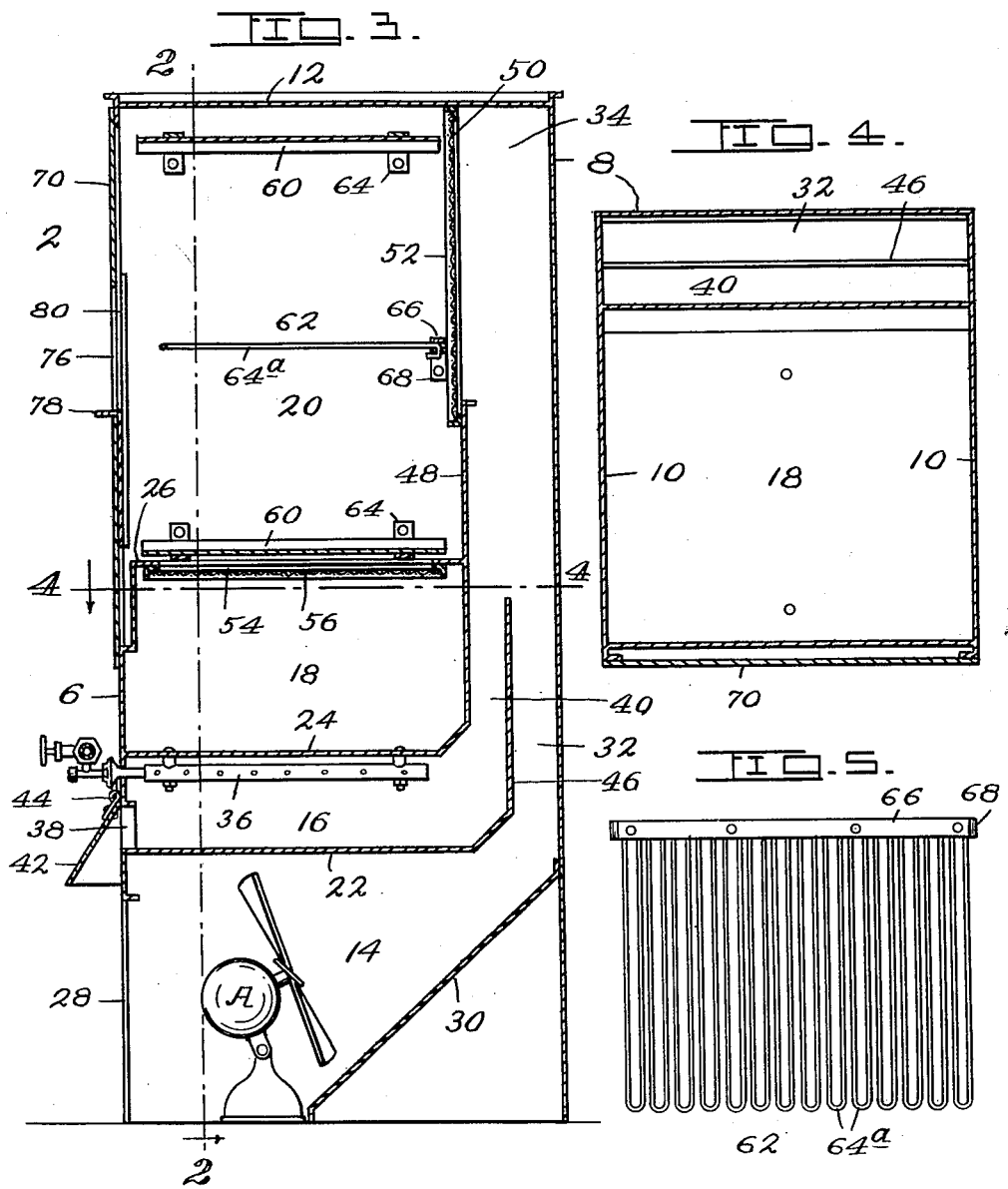
Inventor:
William Stricker,
By
F. G. Fischer,
Attorney.
Witness:
Fred C. Fischer.

Patented Oct. 18, 1927.

1,646,223

UNITED STATES PATENT OFFICE.

WILLIAM STRICKER, OF KANSAS CITY, MISSOURI, ASSIGNOR OF ONE-HALF TO AARON LEVINGSTON, OF KANSAS CITY, MISSOURI.

DRIER.

Application filed October 29, 1926. Serial No. 145,040.

My invention relates to driers of the type disclosed by U. S. Letters Patent No. 1,533,480, which I obtained April 14, 1925. One object of the present invention is to obtain greater efficiency with a given amount of fuel by intermixing the fresh air with the heated air before introducing it into the drying chamber of the apparatus.

Further objects are to obtain more uniform heating of the drying chamber and to simplify and improve the rack which supports the plates containing the glossy prints.

Other objects will hereinafter appear and in order that the invention may be fully understood, reference will now be had to the accompanying drawings, in which:

Fig. 1 is a front elevation of the drying apparatus.

Fig. 2 is a vertical section on line 2—2 of Fig. 3.

Fig. 3 is a vertical section on line 3—3 of Fig. 1.

Fig. 4 is a horizontal cross section on line 4—4 of Fig. 3.

Fig. 5 is a detail plan view of intermediate supporting means constituting a part of the rack.

In carrying out the invention I employ a vertically disposed container 2 consisting of a front wall 6, a rear wall 8, side walls 10, and a flat top 12. All of the walls, excepting the front wall 6, extend the full length of the container 2 and are adapted to rest upon the floor instead of being supported upon legs as in the patent above referred to.

As shown by Figs. 2 and 3, the container 2 is divided into an air chamber 14, a combustion chamber 16, a warm air chamber 18 and a drying chamber 20 by means of partitions 22, 24 and 26.

The air chamber 14 which is lowermost, receives fresh air through an inlet 28 in the front wall 6 and is provided at its rear portion with an air deflector 30 for directing the air upwardly into a duct 32 discharging into a mixing chamber 34 in the upper rear portion of the container 2. Suitable means for drawing fresh air into the air chamber 14 and forcing it upwardly through the duct 32 is provided. In the present instance I have shown said means in the form of an electric fan A, which is located within the chamber 14.

The combustion chamber 16, which is superimposed upon the air chamber 14, is provided with suitable heating means such as a burner 36 and has a fresh air intake 38 at one end and a hot air duct 40 at its opposite end. The air intake 38 is arranged in the front wall 6 of the container 2 and has a shield 42 connected to said front wall 6 by hinges 44, so that said shield 42 may be raised to gain access to the burner 36 for the purpose of lighting the same.

The shield 42, when lowered, extends downwardly at an angle below the air intake 38, as more clearly shown by Fig. 3, to admit air to the intake 38 and at the same time prevent the hot air in the combustion chamber 16 from escaping through said air intake 38. The hot air duct 40 is separated from the fresh air duct 32 by a vertical partition 46 which is connected at its lower portion to the partition 22, and said hot air duct 40 like the fresh air duct 32, discharges into the mixing chamber 34. The mixing chamber 34 is separated from the warm air chamber 18 and the drying chamber 20 by a partition 48 and a screen 50. The partition 48 is connected at its lower portion to the partition 24, while the screen 50, which is provided with a frame 52, is arranged at an opening extending from the upper portion of the partition 48 to the top 12 of the container 2. The screen 50 permits free passage of the warm air from the mixing chamber 34 to the drying chamber 20, but prevents any glossy prints which may become detached, during the drying process, from plates 58, from falling into said mixing chamber 34.

The drying chamber 20, which is superimposed upon the warm air chamber 18, has direct communication with the latter through an opening 54 in the partition 26. Said opening 54 is provided with a screen 56 to prevent any detached glossy prints from falling into the warm air chamber 18. The plates 58 are removably supported at their upper and lower ends by trough-shaped slideways 60 and at their intermediate portions by supporting means 62. The slideways 60 and the supporting means 62 constitute a rack and said slideways 60 are fixed to brackets 64 which extend transversely through the drying chamber 20 and are connected at their ends to the side walls 10 of the container 2. The supporting means 62 consists of a series of equally spaced fingers 64ª clamped at their rear ends between a bar 66 and a bracket 68, respectively, the bracket 68 being secured at its ends to the side walls 10 of the container 2.

Access is had to the drying chamber 20 for the placement and removal of the plates 58 through a door 70, operably connected to the front portion of the container 2 by hinges 72, and said door 70 is provided with a fastener 74 whereby it may be secured in closed position. The door 70 is provided with an air outlet 76 which is controlled by a shutter 78 operating in slideways 80, fixed to the inner side of said door 70.

In practice the prints to be dried are removed from the usual bath and while still wet are applied with the glossy printed side to the enameled surfaces of the plates 58, which are then placed in the rack in the drying chamber 20. The burner 36 is then lighted to heat the air within the combustion chamber 16 which is supplied with fresh air through the intake 38 as the heated air escapes from the combustion chamber 16 through the duct 40. The fan A is also started and draws a large volume of fresh air into the air chamber 14 through the inlet 28 and forces it out through the duct 32. As the heated air and the fresh air are discharged from their respective ducts into the mixing chamber 40 they become thoroughly intermixed and enter the drying chamber 20 through the screen 56. The intermixed fresh and warm air circulates through the drying chamber 20 absorbing moisture from the prints and then escaping through the opening 76 in the front door 70. The intermixed air is supplemented with heated air arising from the chamber 18 through the chamber 20 and hastening the drying process.

From the foregoing description it will be understood that I have provided an efficient drier for the purpose intended, and while I have shown a preferred embodiment of the invention I reserve the right to all such changes and modifications in construction as properly fall within the spirit and scope of the invention as claimed.

Having thus described my invention, what I claim and desire to secure by Letters Patent, is:

1. In a drier, a container, a fresh air duct leading upwardly from the lower front portion to the intermediate rear portion of said container, a warm air duct within said container and extending upwardly beside said fresh air duct, a mixing chamber within the container and into which said ducts discharge, and a drying chamber within the container and into which said mixing chamber discharges.

2. In a drier, a container, a fresh air duct, a warm air duct, a mixing chamber into which said ducts discharge, a drying chamber within the container and into which said mixing chamber discharges, and a door on the container and provided with an outlet communicating with said drying chamber.

3. In a drier, a container, a fresh air duct, a warm air duct, a mixing chamber into which said ducts discharge, a drying chamber within the container and into which said mixing chamber discharges, a door on the container and provided with an outlet communicating with said drying chamber, and a shutter adjustably mounted upon said door for controlling said outlet.

4. In a drier, a container, a fresh air duct, a warm air duct arranged beside said fresh air duct, a mixing chamber into which said ducts discharge, a drying chamber within the container into the rear portion of which said mixing chamber discharges and having an outlet at its front portion, and a rack within said drying chamber.

5. In a drier, a container having an air inlet in its lower portion, an air chamber within the lower portion of said container and communicating with said inlet, a duct leading upwardly into the container from said air chamber, a combustion chamber superimposed upon said air chamber and having an inlet, a shield hinged to the container and arranged when lowered to extend at an angle below the last-mentioned inlet, and a second duct arranged beside the first-mentioned duct and leading upwardly into the container from said combustion chamber.

6. In a drier, a container having a drying chamber, and a rack arranged within said drying chamber and consisting of upper and lower trough-shaped slideways and a horizontally disposed intermediate support.

7. In a drier, a rack consisting of upper and lower horizontally disposed trough-shaped slideways, and a plurality of horizontally disposed spaced fingers clamped together and arranged intermediate said upper and lower slideways.

In testimony whereof I affix my signature.

WILLIAM STRICKER.